(12) United States Patent
Chennavasin

(10) Patent No.: US 9,710,521 B2
(45) Date of Patent: *Jul. 18, 2017

(54) METHOD, APPARATUS, AND COMPUTER PROGRAM PRODUCT FOR RANKING CONTENT CHANNELS

(71) Applicant: Groupon, Inc., Chicago, IL (US)

(72) Inventor: Don Albert Chennavasin, Santa Clara, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,870

(22) Filed: Oct. 5, 2015

(65) Prior Publication Data

US 2016/0098406 A1    Apr. 7, 2016

Related U.S. Application Data

(63) Continuation of application No. 13/800,536, filed on Mar. 13, 2013, now Pat. No. 9,177,031.

(60) Provisional application No. 61/680,607, filed on Aug. 7, 2012.

(51) Int. Cl.
G06F 17/30 (2006.01)
G06Q 30/02 (2012.01)

(52) U.S. Cl.
CPC .... *G06F 17/3053* (2013.01); *G06F 17/30554* (2013.01); *G06F 17/30867* (2013.01); *G06Q 30/02* (2013.01)

(58) Field of Classification Search
CPC combination set(s) only.
See application file for complete search history.

(56) References Cited

U.S. PATENT DOCUMENTS

| | | |
|---|---|---|
| 2002/0032906 A1 | 3/2002 | Grossman |
| 2002/0065802 A1* | 5/2002 | Uchiyama ......... G06F 17/30867 |
| 2002/0128866 A1 | 9/2002 | Goetzke et al. |
| 2003/0229513 A1 | 12/2003 | Spertus |
| 2006/0074769 A1 | 4/2006 | Looney et al. |
| 2007/0050214 A1 | 3/2007 | Hawks et al. |
| 2008/0242280 A1 | 10/2008 | Shapiro et al. |
| 2009/0037958 A1 | 2/2009 | Traw et al. |
| 2009/0199114 A1 | 8/2009 | Lewis et al. |
| 2009/0216563 A1 | 8/2009 | Sandoval et al. |
| 2010/0046842 A1 | 2/2010 | Conwell |

(Continued)

OTHER PUBLICATIONS

Extended European Search Report for European Application No. 132828096.1 dated Feb. 16, 2016.

(Continued)

*Primary Examiner* — Shyue Jiunn Hwa
(74) *Attorney, Agent, or Firm* — Alston & Bird LLP

(57) ABSTRACT

A method, apparatus and computer program product are provided for ranking channel pages of a host system. Content channels may comprise content relating to a particular category or having a commonality. Explicit data provided by user input, and/or implicit data derived or received from a user device or third party may be used to generate explicit and/or implicit parameters. Based on the parameters, content channels may be ranked and displayed in an order based on the ranking, and/or a home content channel may be identified. The host system may therefore target a user with relevant content.

11 Claims, 14 Drawing Sheets

(56) References Cited

U.S. PATENT DOCUMENTS

| | | |
|---|---|---|
| 2010/0094866 A1 | 4/2010 | Cuttner et al. |
| 2010/0153999 A1* | 6/2010 | Yates ................. H04N 5/44543 |
| | | 725/39 |
| 2010/0251305 A1* | 9/2010 | Kimble .............. H04N 7/17318 |
| | | 725/46 |
| 2011/0251988 A1 | 10/2011 | Pronk et al. |
| 2011/0252031 A1 | 10/2011 | Blumenthal et al. |
| 2011/0271314 A1* | 11/2011 | Hoshall .............. H04N 21/4438 |
| | | 725/109 |
| 2011/0289533 A1* | 11/2011 | White ................. G06F 17/3002 |
| | | 725/46 |
| 2011/0321072 A1 | 12/2011 | Patterson et al. |
| 2012/0143996 A1* | 6/2012 | Liebald ............. G06F 17/30702 |
| | | 709/219 |
| 2012/0290950 A1 | 11/2012 | Rapaport et al. |
| 2012/0316934 A1 | 12/2012 | Zier et al. |

OTHER PUBLICATIONS

International Search Report and Written Opinion for Application No. PCT/US13/53963 dated Feb. 21, 2014.
Office Action from U.S. Appl. No. 13/800,536 dated Apr. 22, 2015.
Office Action from U.S. Appl. No. 13/800,536 dated Jun. 27, 2013.
Final Office Action from U.S. Appl. No. 13/800,536 dated Oct. 10, 2013.
Notice of Allowance from U.S. Appl. No. 13/800,536 dated Sep. 10, 2015.

* cited by examiner

METHOD, APPARATUS, AND COMPUTER PROGRAM PRODUCT FOR RANKING CONTENT CHANNELS

CROSS REFERENCE TO RELATED APPLICATIONS

This application claims the benefit of priority to U.S. Provisional Application No. 61/680,607, which was filed Aug. 7, 2012 and is hereby incorporated by reference in its entirety. This application is also a continuation of U.S. application Ser. No. 13/800,536, which was filed Mar. 13, 2013 and is also hereby incorporated by reference in its entirety.

BACKGROUND

Various embodiments of the invention are related to a method and apparatus for ranking content channels of a host system. Through applied effort, ingenuity, and innovation, Applicant has identified a number of deficiencies and problems associated with displaying content channels. Applicant has developed a solution that is embodied by the present invention, which is described in detail below.

BRIEF SUMMARY

A method, apparatus, and computer program product are therefore provided for ranking content channels of a host system. Ranking content channels with respect to a particular user may increase the likelihood of a user viewing relevant content.

A method is provided for receiving user input, generating explicit parameters based on the user input, receiving implicit data, generating implicit parameters based on the implicit data, storing the explicit parameters and the implicit parameters, and identifying a home content channel of a host system based on the explicit parameters and the implicit parameters.

In some embodiments, the method further includes identifying at least one promotion based on the content channel and at least one of the explicit parameters or implicit parameters, and displaying an impression associated with the at least one promotion on the content channel. The explicit parameters and the implicit parameters may be stored in a user information database. The user input may include logon credentials and the explicit parameters may be generated based on profile information associated with the logon credentials. The implicit data may be received from a device used to access the host system, and/or from a third party system.

In some embodiments, the method may further include detecting location information for a device used to access the host system, and generating the implicit parameters based on the location information. The method may further include accessing a purchase history associated with a user, and generating the implicit parameters based on the purchase history.

In some embodiments, the method may include accessing stored cookies on a device used to access the host system, and generating the implicit parameters based on the stored cookies. The method may further include weighting at least two parameters of the explicit parameters and implicit parameters, and identifying the content channel based on the weighted parameters.

A device is also provided, the device including at least one processor and at least one memory including computer program code, the at least one memory and the computer program code configured to, with the processor, cause the device to at least receive user input, transmit a request to access a host system, the request including the user input, identify and transmit implicit data from the device to the host system, receive a response from the host system based on the user input and implicit data, and display a content channel, based on the response.

An apparatus is provided, including at least one processor and at least one memory including computer program code, the at least one memory and the computer program code configured to, with the processor, cause the apparatus to at least receive user input, generate explicit parameters based on the user input, receive implicit data, generate implicit parameters based on the implicit data, store the explicit parameters and the implicit parameters, and identify a content channel from a host system based on the explicit parameters and the implicit parameters.

A computer program product is provided, the computer program product including at least one non-transitory computer-readable storage medium having computer-executable program code instructions stored therein, the computer-executable program code instructions comprising program code instructions to receive user input, generate explicit parameters based on the user input, receive implicit data, generate implicit parameters based on the implicit data, store the explicit parameters and the implicit parameters, and identify a content channel from a host system based on the explicit parameters and the implicit parameters.

A system is provided, including a device and apparatus, the device a device comprising at least one processor and at least one memory including computer program code, the at least one memory and the computer program code configured to, with the processor, cause the device to at least receive user input, transmit a request to access a host system, the request including the user input and implicit data from the device, receive a response from the host system based on the request, and display a content channel, based on the response. The apparatus of the host system may include at least one processor and at least one memory including computer program code, the at least one memory and the computer program code configured to, with the processor, cause the apparatus to at least receive the user input from the device, generate explicit parameters based on the user input, receive implicit data, generate implicit parameters based on the implicit data, store the explicit parameters and the implicit parameters, identify a content channel from a host system based on the explicit parameters and the implicit parameters.

BRIEF DESCRIPTION OF THE SEVERAL VIEWS OF THE DRAWINGS

FIGS. 3A-3K (FIG. 3I intentionally omitted) show example graphical user interface displays that may be presented by various components a promotional system in accordance with some example embodiments discussed herein;

DETAILED DESCRIPTION

Figure 1A:
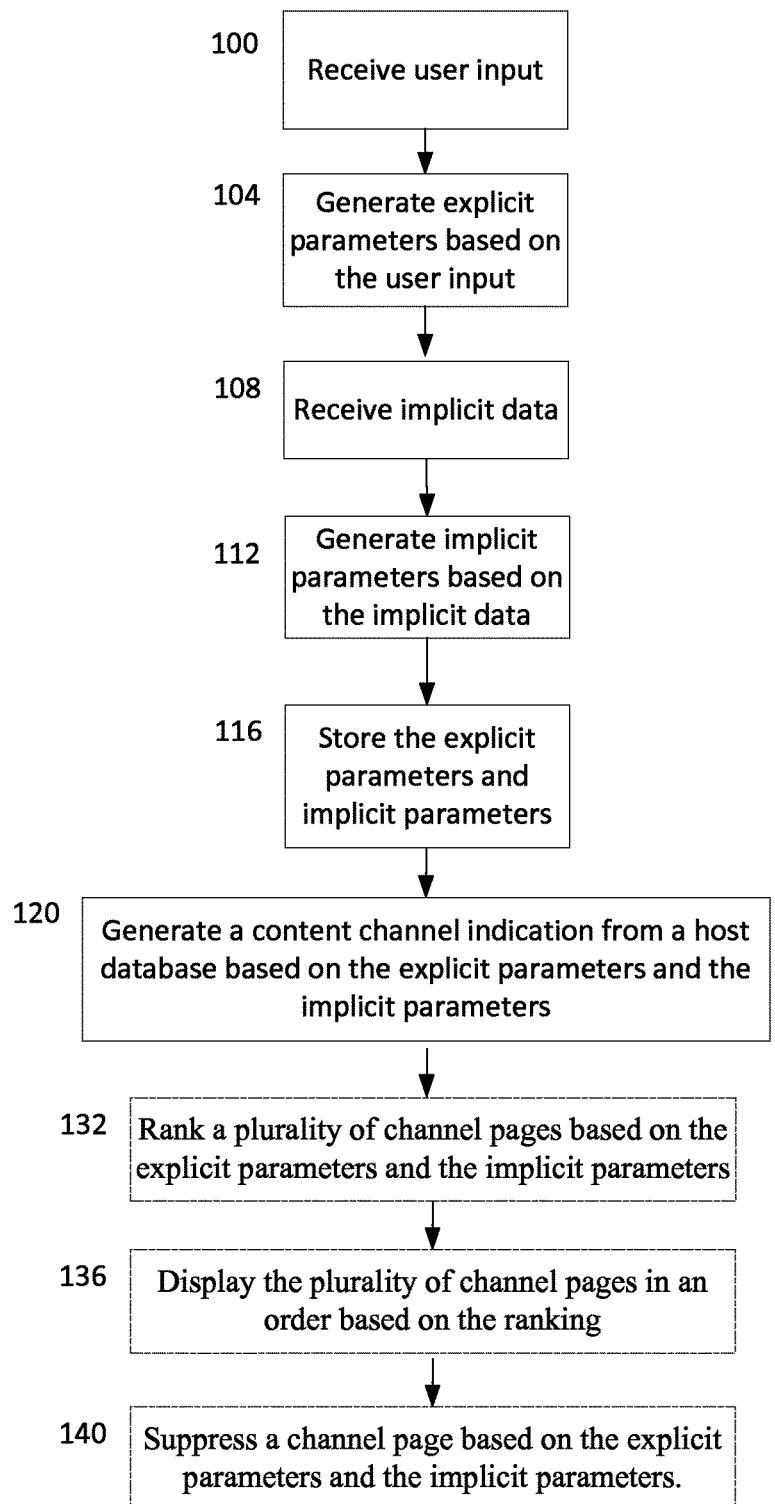
FIG. 1A is a flowchart showing an exemplary process for ranking content channels for a user accessing a host system in accordance with some example embodiments discussed herein.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Host System Embodiment

As described herein, a host system may benefit from the ranking of content channels, and/or identification of a home content channel. A "content channel" may be considered any form of display of content, that may include a selectable link, tab, and/or the like, that when selected, may display content relating to a particular category, topic, and/or the like. In embodiments in which the host system hosts a website, the content channel may be a webpage comprising content related to a particular topic.

Ranking the content channels and/or targeting a user with a particular home content channel may increase the likelihood of a user viewing relevant content, and therefore may improve the user experience and/or increase a user's interest in the a website provided by the host system.

The methods, systems and apparatuses described herein, may enable a host system to identify and individually configure a home content channel for a given user accessing the host system. A home content channel may be identified based on explicit and implicit user data. In this regard, as discussed in greater detail below, the methods, systems, and computer program products discussed herein provide an enhanced user experience.

Analyzing "explicit data," such as user-provided data in user profiles, preferences, and/or web browsing history, for example, may allow the host system to better target their content to users. Additionally or alternatively, accessing "implicit data," data that may be user-provided for a purpose other than for use on the host system and/or that may be detected by the host system, may allow a host system to gather information on user behaviors, preferences and preferred locations. Example implicit data may include a user's browsing history, detected location, or the user's social network profile information, for example. The host system may utilize the explicit data, implicit data, and/or any information available to it to configure a user specific home content channel for presentation to a user upon such user accessing the host system.

FIG. 1A is a flowchart showing an exemplary process for ranking content channels for a user accessing a host system in accordance with some example embodiments discussed herein. In some embodiments, a host system may identify a home channel page for presentation to a user, and it will be appreciated that operations and configurations of a host system are referred to as an example embodiment hereinafter. The illustrated process may be executed by one or more machines (some examples of which are discussed in further detail with respect to FIGS. 4 and 5 below) to provide the example displays illustrated by FIGS. 3A-3K (FIG. 3I intentionally omitted) discussed below, among others, in accordance with some example embodiments discussed herein.

As shown by operation 100, the host system may include wired or wireless connections for receiving user input from a user device, such as via an input/output module. In some embodiments, the user input may be a request to access the host system and/or view content. In some embodiments, the user input may include logon credentials, and/or profile information such as demographic information, preferences, location information, preferred social media information, likes, and dislikes. This information may be provided by the user, such as, for example, by answering questions presented by the host system. The user input may be provided upon accessing the host system, or may be retrieved from a user information database upon providing logon credentials to the host system. In some embodiments, profile information may be stored locally to memory of the user device or to memory of the host system (such as to a host database).

Additionally or alternatively, according to some embodiments, the host system may prompt the user with any number of questions in order to use the location information to its advantage in displaying content and/or ranking channel pages. For example, if a real time location conflicts with a known home location of a user, the host system may prompt the user to provide more information such as requesting that the user indicate whether the real time location is a new home location, a frequently visited travel destination, or a one-time visited location. Any information provided regarding a home location and real time location of a device may be associated with the user and stored locally to the user device or to memory of (or accessible by) the host system and/or host database, and may be considered user input which may be used to generate explicit parameters, as described below.

At operation 104, the host system may generate explicit parameters, with an explicit parameter generation module, based on the user input. In some embodiments, an explicit parameter may include a single value parameter, such as a location of Dallas. Additionally or alternatively, an explicit parameter may include a list of values, such as a list of hobbies which may include basketball, reading, and travel for one user according to an example embodiment. In some embodiments, an explicit parameter may be a binary value, such as a gender parameter indicating that the gender of the user is male or female. An explicit parameter may also be quantitative, for example, such as a user's age.

At operation 108, the host system may receive implicit data, which may be retrieved from the user device. The implicit data may include data from stored cookies (e.g., web browser created text files) on the user device, for example. Any such cookies may be associated with the host system or any other system capable of storing cookies on the user devices. The cookies may comprise information relating to user trends or interests that may allow host system to identify a home content channel to present to a user in order to target the user with a particular content type. In some embodiments, the host system may utilize browsing history to track which third party websites users have recently visited and/or which goods or services users may be purchasing. Additionally or alternatively, the host system may determine a device type (e.g., iPhone®, Blackberry®, etc.) of a user device. In some embodiments, usage of the host system by the user may be considered implicit data. For example, the host system may access data stored by the web browser of the user device that is indicative of the amount of time a user spends viewing specific content, including without limitation, third party content and/or content of the host system. The host system may also track a number of clicks on a user interface of the host system, and/or particular pages or content channels viewed on a user interface of a host system may be considered implicit data. Such information may be considered implicit data, and may be used as discussed herein to further configure the user specific home content channel.

Additionally or alternatively, the host system may receive implicit data such as a detected current location of a user device. Although a user location based on a home location may be accessed in profile information (e.g., a user's home state is California and home city is San Francisco), it may be advantageous for the host system to detect a dynamic, real time, location for the user device (e.g., the user device is currently located in Los Angeles). This detection may be particularly advantageous, for example, when a user is not logged onto the host system, has not provided a home location, and/or a detected real time location conflicts with a known home location of the user. The host system may detect a real time location of a user device by any number of methods. A global positioning system (GPS) operative on the user device may identify a real time location of the device, which may communicate the location to the host system. Similarly, a cell tower triangulation process may be used to identify a real time location of the user device, which may be transmitted to a host system. Additionally, a real time location of a user device may be detected by use of a Wi-Fi access point. Once a user device detects a Wi-Fi access point, the user device and/or host system may therefore identify the location of the user device. Additionally or alternatively, a host system may detect a real time location of user device by accessing cookies stored on the device, and/or a device type of the user device used to access the host system. The real time location may be considered implicit data, and may be used by the host system in identifying a channel page.

Another example of implicit data may include data received from a third party system, such as a host system of a social networking website, or other system capable of storing user information. A user may therefore provide preferences, activities, or other information to a third party system, and the host system may receive the information as implicit data.

As shown by operation 112, the host system may include means, such as an implicit parameter generation module, for generating implicit parameters based on the implicit data. Similar to an explicit parameter, an implicit parameter may be a multi-value variable, or binary, for example. An implicit parameter may be a location of a device, or a device type, based on the implicit data. In some embodiments, particularly those in which use of the host system is captured as implicit data, implicit parameters may be generated indicating the interest level of a user, and/or likelihood of the user being interested in a particular content channel. Additionally or alternatively, an implicit parameter may include information regarding purchase history on third party sites.

In some embodiments, as shown by operation 116, the explicit parameters and/or implicit parameters may be stored in a user information database, and associated with a user. As such, explicit parameters may be subsequently retrieved by the host system. The host system may identify a user by user-provided logon credentials, for example, and retrieve the explicit parameters from a user information database.

At operation 120, the host system may include means for generating a content channel indication from a host database based on the explicit parameters and the implicit parameters. In some embodiments, for example, the content channel indication may indicate to initially display a "news" content channel, and/or "entertainment" content channel. Regardless of the indication, the home content channel may be identified based on the explicit parameters and implicit parameters, with the goal of increasing user interest in the particular category of content displayed on the content channel, relative to displaying content channels at random.

Continuing to operation 132, the host system may be configured to rank a plurality of content channels based on the explicit parameters and implicit parameters. As such, where as a home content channel may be identified as a relevant content channel, other content channels may be ranked according to relevancy, and based on the explicit parameters and the implicit parameters. In some embodiments, the ranking may indicate that the first ranked content channel is the home content channel (e.g., the initial landing page for the user).

At operation 136, the host system may therefore display, on the user device for example, the plurality of content channels in an order based on the ranking. For example, in embodiments in which the content channels are represented by tabs, the order of the tabs may be based on the ranking and/or explicit and implicit parameters. The host system may output a plurality of ranked content channels for display on the user device.

Similarly, at operation 140, the host system may include means for suppressing a content channel based on the explicit parameters and the implicit parameters. In some embodiments, content channels ranking low or the lowest, or below some predetermined threshold, may be suppressed and/or rendered inaccessible by a user. As such, the host system may not only order and present a series of content channels to a user based on a ranked relevancy (as determined based on implicit and explicit parameters) but may also limit access to one or more content channels that are deemed to have little or no relevancy (e.g., a ranking below a pre-defined threshold) for the particular user.

Figure 1B:
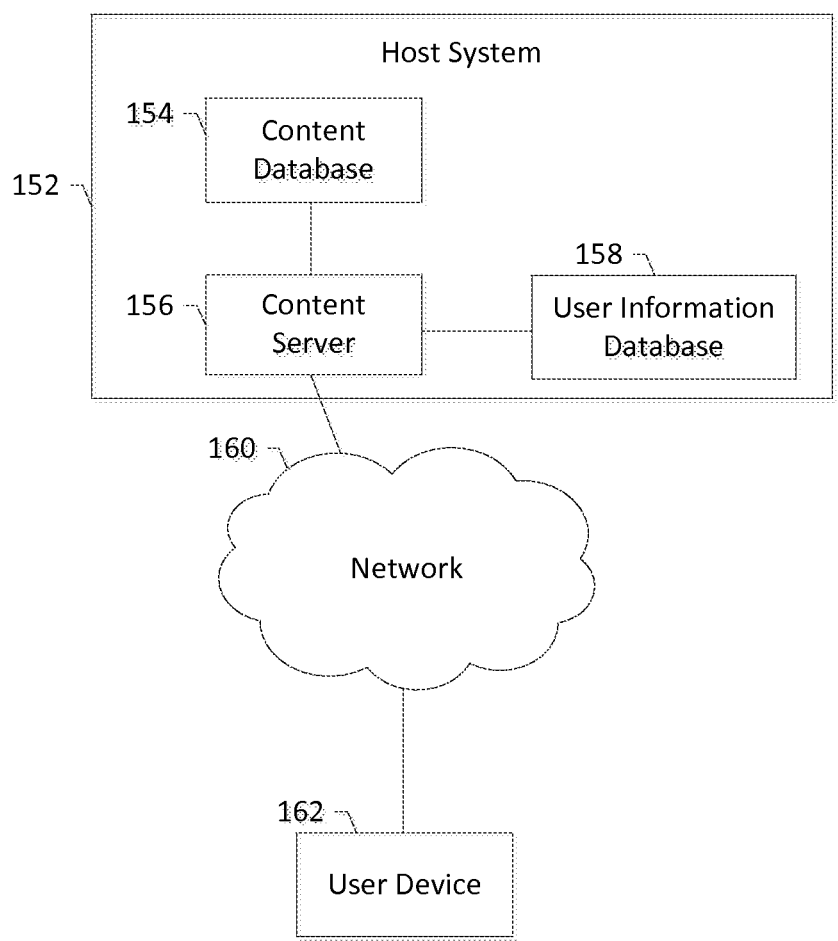
FIG. 1B shows an example system in accordance with some example embodiments discussed herein.

FIG. 1B shows an example system in accordance with some example embodiments discussed herein. For example, system 150 may include host system 152, which can include, for example, content database 154, content server 156, and user information database 158, among other things (not shown). Content server 156 can be any suitable network server and/or other type of processing device. Content database 154 can be any suitable network database configured to store content and/or content categories relating to channel pages, such as that discussed herein. User information database 158 can be any suitable network database configured to store user data, profile data, and/or the like. In some embodiments, the user information database may be implemented on the same device as the content database 154. In this regard, host system 152 may include, for example, at least one backend data server, network database, cloud computing device, among other things.

Host system 152 may be coupled to one or more user devices 162 via network 160. In this regard, network 160 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 160 may include a cellular telephone, an 802.11, 802.16, 802.20, and/or WiMax network. Further, the network 160 may include a public network, such as the Internet, a private network, such as an intranet, or combinations thereof, and may utilize a variety of networking protocols now available or later developed including, such as, but not limited to, TCP/IP based networking protocols. Network 160 may be used to transmit implicit and/or explicit data from a user device 162 to the host system 152. Requests and responses to and from the host system 152 may also be transmitted over network 160 in order to facilitate the ranking of channel pages, and other features of the host system described here in.

User devices 162 may each be implemented as a personal computer and/or other networked device, such as a cellular phone, tablet computer, mobile device, etc., that may be used for accessing host system 152 in order to view content. The user device 162 may additionally or alternatively be used to provide explicit and/or implicit data to the host system 152. In some embodiments, the user device 162 may be capable of detecting a real time location, and provided the location to the host system 152, as described herein.

Figure 1C:
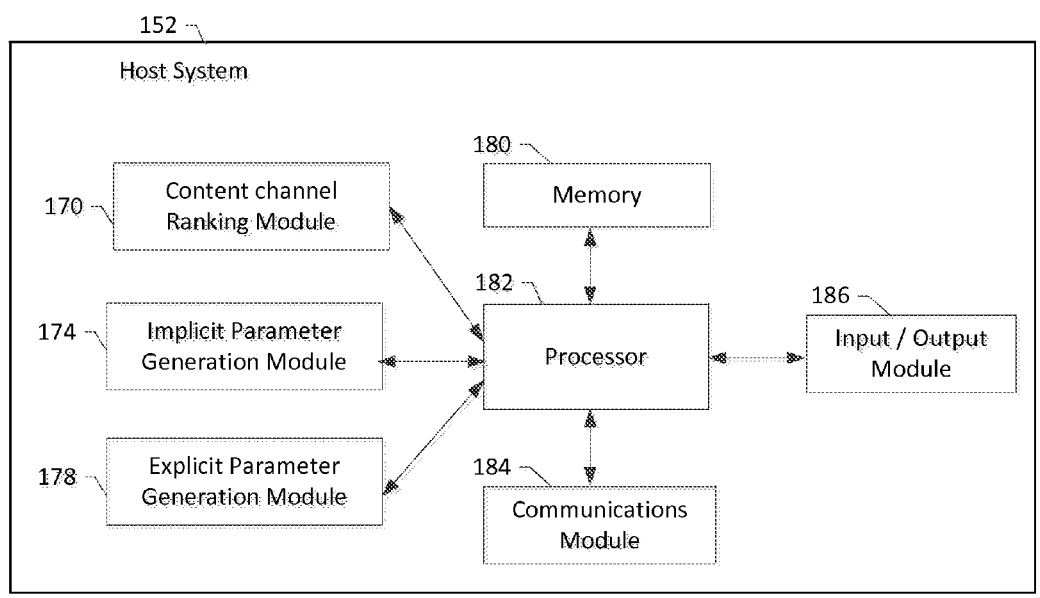
FIG. 1C is a schematic block diagram of circuitry that can be included in included in a computing device, such as a host system, in accordance with some example embodiments discussed herein.

FIG. 1C is a schematic block diagram of circuitry that can be included in included in a computing device, such as a host system 152, in accordance with some example embodiments discussed herein. Host system 152 may include various means, such as one or more processors 182, memories 180, communications modules 184, and/or input/output modules 186. In some embodiments, a content channel ranking module 170 may be included. As referred to herein, the term "module" includes hardware, software and/or firmware configured to perform one or more particular functions. In this regard, host system 152 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 180) that is executable by a suitably configured processing device (e.g., processor 182), or some combination thereof.

Processor 182 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated as a single processor, in some embodiments, processor 182 comprises a plurality of processors. The plurality of processors may be embodied on a single computing device or may be distributed across a plurality of computing devices collectively configured to function as host system 152. The plurality of processors may be in operative communication with each other and may be collectively configured to perform one or more functionalities of host system 152 as described herein. In an example embodiment, processor 182 is configured to execute instructions stored in memory 180 or otherwise accessible to processor 182. These instructions, when executed by processor 182, may cause host system 152 to perform one or more of the functionalities of host system 152 as described herein.

Whether configured by hardware, firmware/software methods, or by a combination thereof, processor 182 may comprise an entity capable of performing operations according to embodiments of the present invention while configured accordingly. Thus, for example, when processor 182 is embodied as an ASIC, FPGA or the like, processor 182 may comprise specifically configured hardware for conducting one or more operations described herein. As another example, when processor 182 is embodied as an executor of instructions, such as may be stored in memory 180, the instructions may specifically configure processor 182 to perform one or more operations described herein, such as those discussed in connection with FIG. 1A.

Memory 180 may comprise, for example, volatile memory, non-volatile memory, or some combination thereof. Although illustrated as a single memory, memory 180 may comprise a plurality of memory components. The plurality of memory components may be embodied on a single computing device or distributed across a plurality of computing devices. In various embodiments, memory 180 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 180 may comprise content database 154 and/or user information database 158. Memory 180 may be configured to store information, data (including user information), applications, instructions, or the like for enabling host system 152 to carry out various functions in accordance with example embodiments of the present invention. For example, in at least some embodiments, memory 180 is configured to buffer input data for processing by processor 182. Additionally or alternatively, in at least some embodiments, memory 180 may be configured to store program instructions for execution by processor 182. Memory 180 may store information in the form of static and/or dynamic information. This stored information may be stored and/or used by host system 152 during the course of performing its functionalities.

Communications module 184 may be embodied as any device or means embodied in circuitry, hardware, a computer program product comprising computer readable program instructions stored on a computer readable medium (e.g., memory 180) and executed by a processing device (e.g., processor 182), or a combination thereof that is configured to receive and/or transmit data from/to another device, such as, for example, a second host system 152 and/or the like. In some embodiments, communications module 184 (like other components discussed herein) can be at least partially embodied as or otherwise controlled by processor 182. In this regard, communications module 184 may be in communication with processor 182, such as via a bus. Communications module 184 may include, for example, an antenna, a transmitter, a receiver, a transceiver, network interface card and/or supporting hardware and/or firmware/software for enabling communications with another computing device. Communications module 184 may be configured to receive and/or transmit any data that may be stored by memory 180 using any protocol that may be used for communications between computing devices. Communications module 184 may additionally or alternatively be in communication with the memory 180, input/output module 186 and/or any other component of host system 152, such as via a bus.

Input/output module 186 may be in communication with processor 182 to receive an indication of a user input and/or to provide an audible, visual, mechanical, or other output to a user (e.g., provider and/or user). As such, input/output module 186 may include support, for example, for a keyboard, a mouse, a joystick, a display, a touch screen display, a microphone, a speaker, a RFID reader, barcode reader, biometric scanner, and/or other input/output mechanisms. In embodiments wherein host system 152 is embodied as a server or database, aspects of input/output module 186 may be reduced as compared to embodiments where host system 152 is implemented as an end-user machine (e.g., user device and/or provider device) or other type of device designed for complex user interactions. In some embodiments (like other components discussed herein), input/output module 186 may even be eliminated from host system 152. Alternatively, such as in embodiments wherein host system 152 is embodied as a server or database, at least some aspects of input/output module 186 may be embodied on an apparatus used by a user that is in communication with host system 152, such as for example, provider device 420. Input/output module 186 may be in communication with the memory 180, communications module 184, and/or any other component(s), such as via a bus. Although more than one input/output module and/or other component can be included in host system 152, only one is shown to avoid overcomplicating the drawing (like the other components discussed herein).

Content channel ranking module 170 may provide functionality in ranking content channels and/or determining an initial home content channel for a user to land on when accessing host system 152 as described herein. In some embodiments, some or all of the functionality for ranking content channels and/or identifying a home content channel may be performed by processor 182. In this regard, the example processes discussed herein can be performed by at least one processor 182 and/or content channel ranking module 170. For example, non-transitory computer readable storage media can be configured to store firmware, one or more application programs, and/or other software, which include instructions and other computer-readable program code portions that can be executed to control each processor (e.g., processor 182 and/or content channel ranking module 170) of the components of system 150 to implement various operations, including the examples described above. As such, a series of computer-readable program code portions are embodied in one or more computer program products and can be used, with a computing device, server, and/or other programmable apparatus, to produce machine-implemented processes.

Implicit parameter generation module 174 may provide functionality in generating implicit parameters based on implicit data as described herein. In some embodiments, some or all of the functionality for generating implicit parameters may be performed by processor 182. In this regard, the example processes discussed herein can be performed by at least one processor 182 and/or implicit parameter generation module 174. For example, non-transitory computer readable storage media can be configured to store firmware, one or more application programs, and/or other software, which include instructions and other computer-readable program code portions that can be executed to control each processor (e.g., processor 182 and/or implicit parameter generation module 174) of the components of system 150 to implement various operations, including the examples described above. As such, a series of computer-readable program code portions are embodied in one or more computer program products and can be used, with a computing device, server, and/or other programmable apparatus, to produce machine-implemented processes.

Explicit parameter generation module 178 may provide functionality in generating explicit parameters based on user input as described herein. In some embodiments, some or all of the functionality for generating explicit parameters may be performed by processor 182. In this regard, the example processes discussed herein can be performed by at least one processor 182 and/or explicit parameter generation module 178. For example, non-transitory computer readable storage media can be configured to store firmware, one or more application programs, and/or other software, which include instructions and other computer-readable program code portions that can be executed to control each processor (e.g., processor 182 and/or explicit parameter generation module 178) of the components of system 150 to implement various operations, including the examples described above. As such, a series of computer-readable program code portions are embodied in one or more computer program products and can be used, with a computing device, server, and/or other programmable apparatus, to produce machine-implemented processes.

Figure 1D:
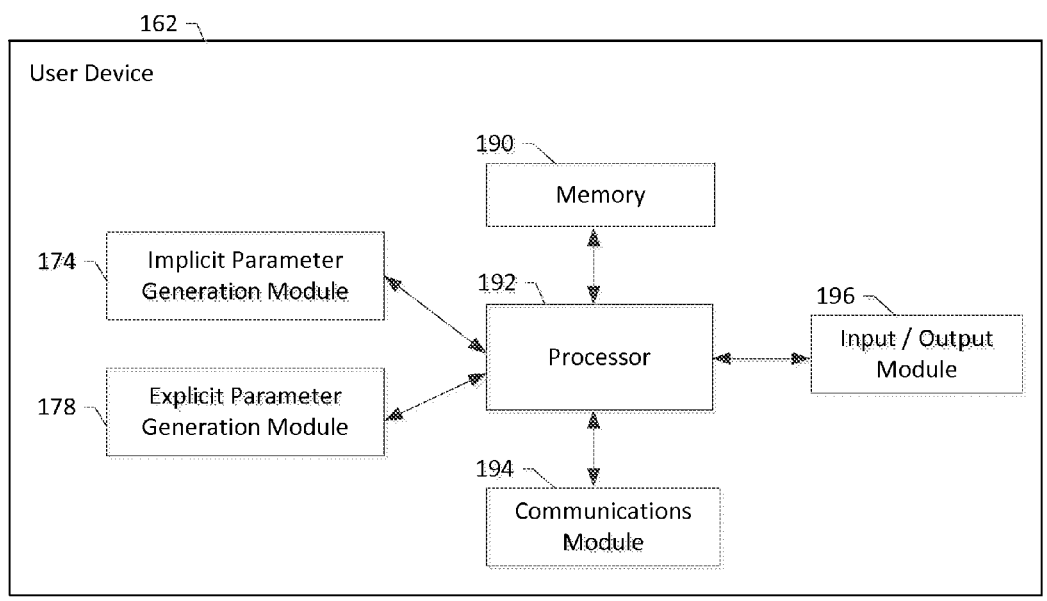
FIG. 1D is a schematic block diagram of circuitry that can be included in a computing device, such as a user device, in accordance with some example embodiments discussed herein.

FIG. 1D is a schematic block diagram of circuitry that can be included in a computing device, such as a user device 162, in accordance with some example embodiments discussed herein. In some example embodiments, the implicit parameter generation module 174 and/or explicit parameter generation module 514 may be implemented on the user device 162. The user device 162 may include means, such as an input/output module 196, or a user interface, for receiving user input. The implicit parameter generation module 174 and/or explicit parameter generation module 514 may be utilized by the user device to generate parameters that may be transmitted, such as by communications module 194, over a network to a host system, such as host system 152. In some embodiments, the generation of explicit and/or implicit parameters may be controlled partially, or completely, by a processor 602, of the user device 162. The user device 162 may access data from local memory, such as memory 190, to generate the explicit and/or implicit parameters, and transmit data to the host system 152. In response, the user device 162 may receive the content channel indication, and display a content channel with the input/output module 196, as described above. It will be appreciated that FIG. 1D is an example configuration of a user device, according to an example embodiment, and that numerous other configurations of a user device may be implemented. Additionally, some or all of the components described with respect to the user device 162 in FIG. 1D may be implemented on the host system, such as the host system 152 of FIG. 1C.

Promotional System Embodiment

In some embodiments, a host system may be implemented as a promotional system to offer promotions to a consumer. A promotion and marketing service may utilize a host system, such as a promotional system, to offer such promotions. A "promotion and marketing service" may provide promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A "promotion" may be a deal purchased by a consumer from a promotional system, and may be considered an agreement for a particular provider to provide a service or good (e.g., a discounted service or good) to the consumer. A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

A "provider" may be considered a merchant or other provider of goods or services that offers a promotion, as agreed upon with the promotion and marketing service affiliated with the promotional system. A provider may include, but is not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may the form of a running company that sells attire that is generally used by a person who runs or participates in athletic activities.

An "impression" may be considered a communication advertising an offer to purchase a promotion from a promotional system. An impression may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

Impressions are therefore provided to "consumers," including, but not limited to, a client, customer, purchaser, shopper, user of the promotional system or the like who may be in the position to or does exchange value for one or more instruments under the terms defined by the one or promotions. For example, and using the aforementioned running company as the example provider, an individual who is interested in purchasing running shoes.

A promotional system may output a channel page, or plurality of channel pages for display on a consumer device. A "channel page" may be a content channel which presents impressions associated with promotions of a particular category or type (e.g., featured, getaways, goods, services, etc.) grouped together based on some common characteristic. When a channel page is selected, impressions of promotions relating to that channel may be displayed. Any number of impressions may be displayed on a channel page. A "home channel page" may refer to the initial channel page (i.e., a landing page) that is presented to a consumer upon accessing the promotional system. Targeting a consumer with a particular home channel page may increase the likelihood of a consumer viewing a promotion of interest, and may therefore cause an increase in promotion sales on the promotional system.

The methods, systems and apparatuses described herein, may enable a host system to identify and individually configure a home channel page for a given consumer accessing the host system. In an example embodiment, a promotional system operates as a host system to identify a home channel page on which to provide promotions to consumer. A home channel page may be identified based on explicit and implicit consumer data. In this regard, as discussed in greater detail below, the methods, systems, and computer program products discussed herein provide an enhanced consumer experience and greater promotion purchase efficiency.

Analyzing "explicit data," such as user-provided data in user profiles, preferences, and/or promotion purchase history, for example, may allow the promotional system to better target promotion types or channels to consumers. A consumer may be more likely to purchase a promotion if the impression advertising the promotion is of interest to the consumer than if the associated promotion was selected at random. Additionally or alternatively, accessing "implicit data," data that may be user-provided for a purpose other than for use on the promotional system and/or detected by the promotional system, may allow a promotional system to gather information on consumer behaviors, preferences and preferred locations. Example implicit data may include a consumer's browsing history, detected location, or the consumer's social network profile information, for example. The promotional system may utilize the explicit data, implicit data, and/or any information available to it to configure a consumer-specific home channel page for presentation to a consumer upon such consumer accessing the promotional system.

Figure 2A:
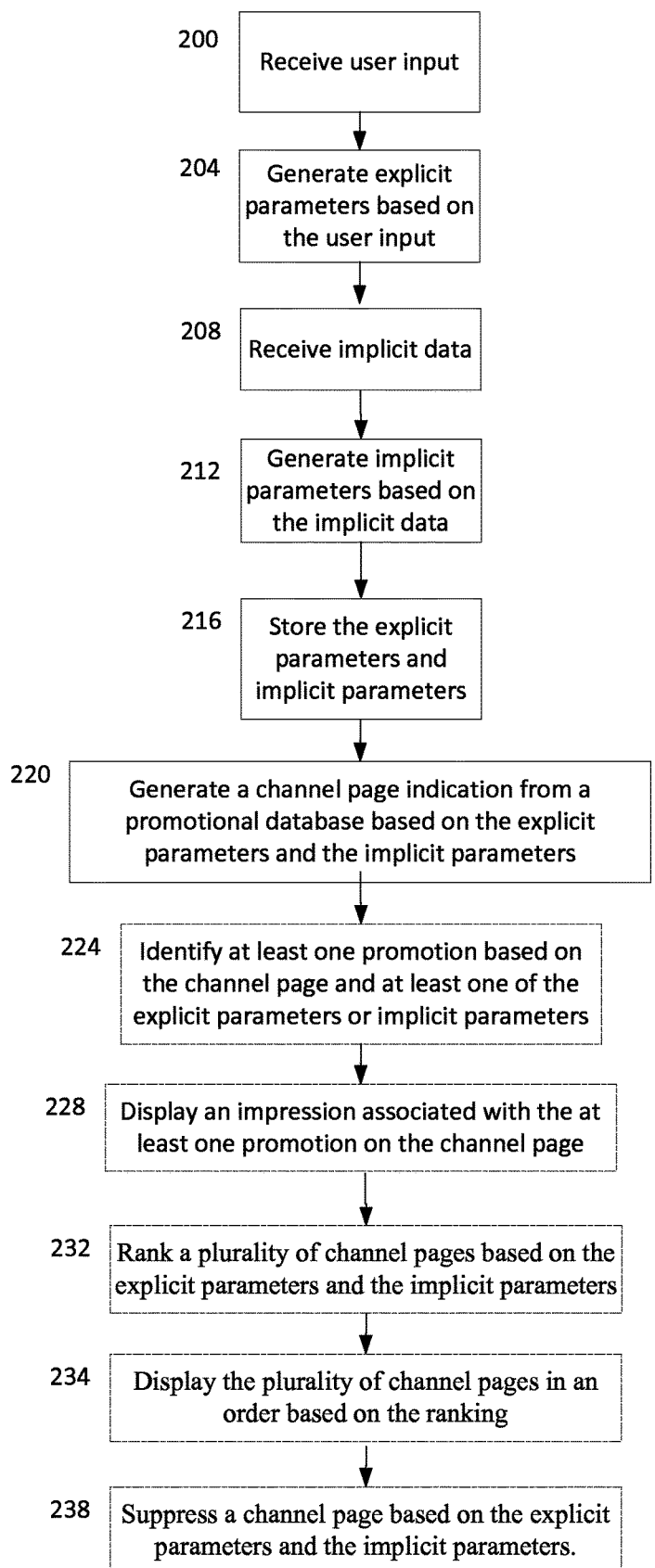
FIGS. 2A-2C are flowcharts showing exemplary processes for ranking channel pages for a consumer accessing a promotional system in accordance with some example embodiments discussed herein.

FIG. 2A is a flowchart showing an exemplary process for ranking channel pages for a consumer accessing a promotional system in accordance with some example embodiments discussed herein. In some embodiments, a promotional system may identify a home channel page for presentation to a consumer, and it will be appreciated that operations and configurations of a promotional system are referred to as an example embodiment hereinafter. The illustrated process may be executed by one or more machines (some examples of which are discussed in further detail with respect to FIGS. 4-6 below) to provide the example displays illustrated by FIGS. 3A-3K (FIG. 3I intentionally omitted) discussed below, among others, in accordance with some example embodiments discussed herein.

As shown by operation 200, the promotional system may include wired or wireless connections for receiving user input from a consumer device, such as via an input/output module. In some embodiments, the user input may be a request to access the promotional system and/or view promotions. In some embodiments, the user input may include logon credentials, and/or profile information such as demographic information, preferences, location information, preferred social media information, likes, and dislikes. This information may be provided by the consumer, such as, for example, by answering questions presented by the promotional system. The user input may be provided upon accessing the promotional system, or may be retrieved from a consumer database upon providing logon credentials to the promotional system. In some embodiments, profile information may be stored locally to memory of the consumer device or to memory of the promotional system (such as to a promotional database).

Additionally or alternatively, according to some embodiments, the promotional system may prompt the consumer with any number of questions in order to use the location information to its advantage in marketing promotions. For example, if a real time location conflicts with a known home location of a consumer, the promotional system may prompt the consumer to provide more information such as requesting that the consumer indicate whether the real time location is a new home location, a frequently visited travel destination, or a one-time visited location. Any information provided regarding a home location and real time location of a device may be associated with the consumer and stored locally to the consumer device or to memory of (or accessible by) the promotional system and/or promotional database, and may be considered user input which may be used to generate explicit parameters, as described below.

At operation 204, the promotional system may generate explicit parameters, with an explicit parameter generation module 178, based on the user input. In some embodiments, an explicit parameter may include a single value parameter, such as a location of Dallas. Additionally or alternatively, an explicit parameter may include a list of values, such as a list of hobbies which may include basketball, reading, and travel for one consumer according to an example embodiment. In some embodiments, an explicit parameter may be a binary value, such as a gender parameter indicating that the gender of the consumer is male or female. An explicit parameter may also be quantitative, for example, such as a consumer's age.

At operation 208, the promotional system may receive implicit data, which may be retrieved from the consumer device. The implicit data may include data from stored cookies (e.g., web browser created text files) on the consumer device, for example. Any such cookies may be associated with the promotional system or any other system capable of storing cookies on the consumer devices. The cookies may comprise information relating to consumer trends or interests that may allow promotional system to identify a home channel page to present to a consumer in order to target the consumer with a particular promotion type or channel of promotions. In some embodiments, the promotional system may utilize browsing history to track which third party websites consumers have recently visited and/or which goods or services consumers may be purchasing. Additionally or alternatively, the promotional system may determine a device type of a consumer device. In some embodiments, use of the promotion system by the user may be considered implicit data. The amount of time a user spends viewing specific channel pages, or the fact that user selects to read customer reviews of a promotion or merchant may be considered implicit data. Such information may be considered implicit data, and may be used as discussed herein to further configure the consumer specific home channel page.

Additionally or alternatively, the promotional system may receive implicit data such as a detected current location of a consumer device. Although a consumer location based on a home location may be accessed in profile information (e.g., a consumer's home state is California and home city is San Francisco), it may be advantageous for the promotional system to detect a dynamic, real time, location for the consumer device (e.g., the consumer device is currently located in Los Angeles). This detection may be particularly advantageous, for example, when a consumer is not logged onto the promotional system, has not provided a home location, and/or a detected real time location conflicts with a known home location of the consumer. The promotional system may detect a real time location of a consumer device by any number of methods. A global positioning system (GPS) operative on the consumer device may identify a real time location of the device, which may communicate the location to the promotional system. Similarly, a cell tower triangulation process may be used to identify a real time location of the consumer device, which may be transmitted to a promotional system. Additionally, a real time location of a consumer device may be detected by use of a Wi-Fi access point. Once a consumer device detects a Wi-Fi access point, the consumer device and/or promotional system may therefore identify the location of the consumer device. Additionally or alternatively, promotional system may detect a real time location of consumer device by accessing cookies stored on the device. The real time location may be considered implicit data, and may be used by the promotional system in identifying a channel page.

Another example of implicit data may include data received from a third party system, such as a host system of a social networking website, or other system capable of storing consumer information. A consumer may therefore provide preferences, activities, or other information to a third party system, and the promotional system may receive the information as implicit data.

As shown by operation 212, the promotional system may include means, such as an implicit parameter generation module 174, for generating implicit parameters based on the implicit data. Similar to an explicit parameter, an implicit parameter may be a multi-value variable, or binary, for example. An implicit parameter may be a location of a device, or device type, based on the implicit data. In some embodiments, particularly those in which use of the promotional system is captured as implicit data, implicit parameters may be generated indicating the interest level of a user, and/or likelihood of the user being interested in a particular promotion and/or channel page. Additionally or alternatively, an implicit parameter may include information regarding purchase history on third party sites.

In some embodiments, as shown by operation 216, the explicit parameters and/or implicit parameters may be stored in a user information database, and associated with a consumer. As such, explicit parameters may be subsequently retrieved by the promotional system. The promotional system may identify a consumer by user-provided logon credentials, for example, and retrieve the explicit parameters from a user information database.

At operation 220, the promotional system may include means for generating a channel page indication from a promotional database based on the explicit parameters and the implicit parameters. In some embodiments, the indication may identify a home channel page. In some embodiments, an example home channel page may be "getaways" for a consumer having an associated explicit parameter or implicit parameters indicating that travel is a hobby. "Goods" may be a home channel page for a consumer for which associated implicit data and/or parameters indicates the consumer shops frequently, spends a lot on household goods, and/or spends a significant amount of time searching for sales on the Internet, for example. A "dinner deal" home channel page may be identified for a consumer who updates a social networking site to indicate the consumer dines out often. In some embodiments, a series of ranked rules may override or otherwise outweigh considerations of other explicit and/or implicit data. For example, based on the date and/or time, the promotional system may identify a home channel page, such as a "Goods" channel on or in the three days prior to black Friday. Additionally or alternatively, if a consumer device location is determined to be away from home, the promotional system may identify a home chancel page relating to dining out.

Additionally or alternatively, implicit data and/or parameters may be utilized to infer additional explicit data and/or parameters. A device type may be utilized to infer socio-economic indicators and/or consumer habits, and may be considered in the identification of a home channel page. For example, based on trends or analytics associated with past use of a particular type of consumer device (e.g., an iPhone®), the promotional system may determine that there is a higher probability that the user of a selected consumer device is in the age range of 18-30, and perhaps more likely to be male or female, and thus base the channel page indication on such inferences, probabilities, or likelihoods.

In some embodiments, the channel page indication may be a unique identifier associated with the channel page type, a Uniform Resource Locator (URL) to be transmitted to a consumer device, and/or any means for identifying a channel page. Regardless of the indication, the home channel page may be identified based on the explicit parameters and implicit parameters, with the goal of increasing consumer interest in the particular category of promotions displayed on the channel page, relative to the interest that may be created upon displaying impressions of promotions or channel pages at random.

At operation 224, the promotional system may include means, such as the home channel page identification module, for identifying at least one promotion based on the channel page and at least one of the explicit parameters and the implicit parameters. In some embodiments, promotions may be accessed from the promotional database and/or other memory of the promotional system. The promotional system may therefore identify promotions associated with any number of the explicit parameters and implicit parameters, as well as the channel page identified with respect to operation 220. In some embodiments, promotions stored on promotional database may be associated with any number of channel pages, explicit parameters, and implicit parameters. For example, a promotion for a one-day boat excursion from Charleston may be associated with the channel page for "getaways" as well as a location parameter indicating Charleston as a home location (e.g., explicit parameter) or a detected location (e.g., implicit parameter).

At operation 228, the promotional system may display, on the consumer device, an impression associated with the at least one promotion on the channel page. In the example embodiment described above, the impression for a boat excursion promotion may be presented to a consumer whose home channel page is identified as "getaways" and has associated explicit and/or implicit parameters indicating a location of Charleston. As such, the promotional system may configure a channel page for a particular consumer, presenting impressions that are likely of interest to the consumer, therefore increasing the sales potential of the associated promotions.

Continuing to operation 232, the promotional system may be configured to rank a plurality of channel pages based on the explicit parameters and implicit parameters. As such, where as a home channel page may be identified as a relevant channel page, other channel pages may be ranked according to relevancy, and based on the explicit parameters and the implicit parameters. At operation 234, the promotional system may therefore display, on the consumer device for example, the plurality of channel pages in an order based on the ranking. For example, in embodiments in which the channel pages are represented by tabs, the order of the tabs may be based on the ranking and/or explicit and implicit parameters. The promotional system may output a plurality of ranked channel pages for display on the consumer device.

Similarly, at operation 238, the promotional system may include means for suppressing a channel page based on the explicit parameters and the implicit parameters. In some embodiments, channel pages ranking low or the lowest, or below some predetermined threshold, may be suppressed and/or rendered inaccessible by a user. As such, the promotional system may not only order and present a series of channel pages to a user based on a ranked relevancy (as determined based on implicit and explicit parameters) but may also limit access to one or more channel pages that are deemed to have little or no relevancy (e.g., a ranking below a pre-defined threshold) for the particular user.

Figure 2B:
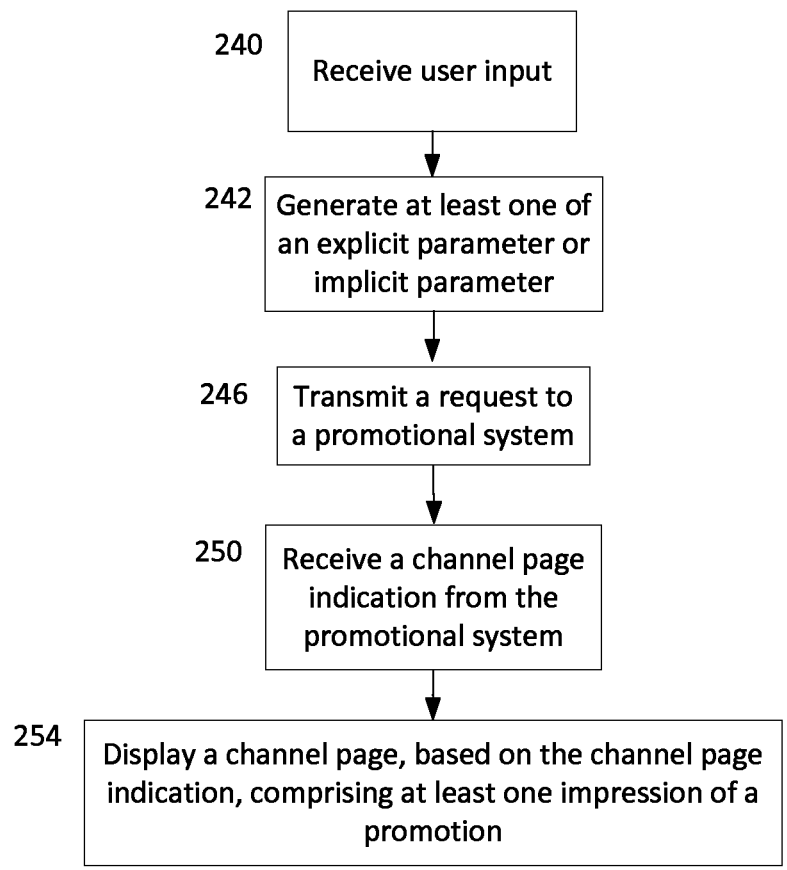

While FIG. 2A illustrates operations of a promotional system for ranking channel pages, FIG. 2B illustrates operations of a consumer device for displaying a home channel page.

At operation 240, the consumer device may receive a user input, such as a username and password, via a user interface of the consumer device. In some embodiments, the username and password may be stored locally on the consumer device, and may be retrieved from memory. In some embodiments, at operation 242, the consumer device may comprise a module for generating at least one of an explicit parameter or implicit parameter. The explicit parameter may be generated based on the username and password, for example. In some embodiments, profile information may be retrieved from memory of the consumer device (or from a promotional system). Implicit parameters may be generated locally on the device, such as with an implicit parameter generation module, based on data retrieved from memory and/or third party systems.

Continuing to operation 246, the consumer device may transmit a request to a promotional system. The request may comprise any of the user input, explicit parameters, and/or implicit parameters. In response to the request, at operation 250, the consumer device may receive a channel page indication from the promotional system. The channel page indication may be in the form of an identifier used to identify a channel page to be displayed, or the consumer device may receive a URL from the promotional system. At operation 254, the consumer device may then display a channel page, based on the channel page indication, comprising at least one impression of a promotion. As such, a consumer using the consumer device may view promotions related to the indicated home channel page, which may be targeted based on the explicit and/or implicit parameters generating on the user device. The operations of FIGS. 2A and 2B are provided as examples, and it will be appreciated that various configurations may be implemented, such that some operations are performed by the promotional system, and some operations are performed by the consumer device.

Figure 2C:
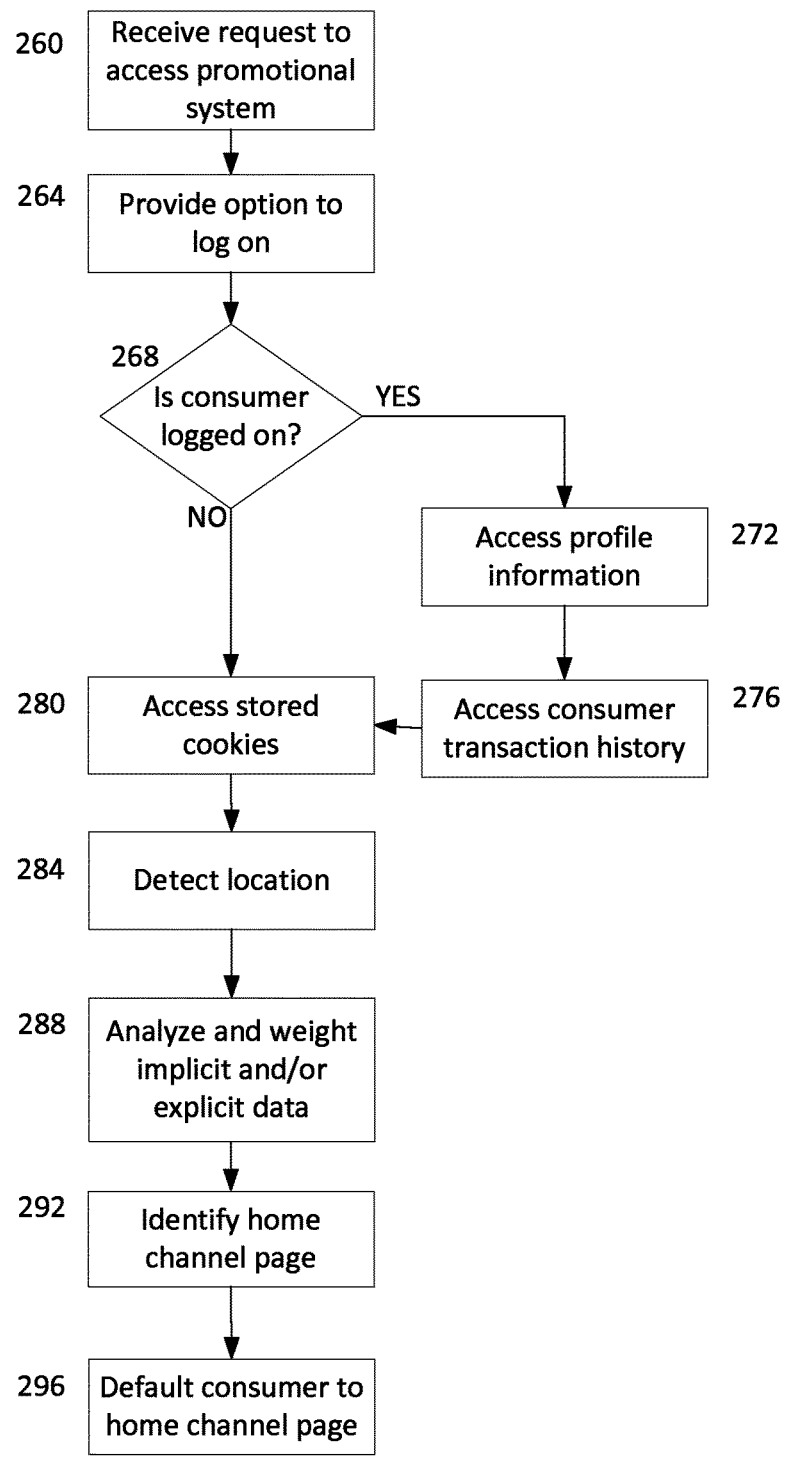

FIG. 2C illustrates an additional exemplary process for identifying a home channel page that may be presented to a consumer upon such consumer accessing a host system, such as the promotional system. The illustrated process may be executed by one or more machines (some examples of which are discussed in further detail with respect to FIGS. 4-6 below) to provide the example displays illustrated by FIGS. 3A-3K (FIG. 3I intentionally omitted) discussed below, among others, in accordance with some example embodiments discussed herein.

At operation 260, promotional system 402 may receive a request to access the promotional system. Such a request may be initiated by a consumer using a consumer device to access a website hosted by the promotional system. In some embodiments, the promotional system may transmit push notifications to a consumer device. Upon being alerted of the communication, the consumer may opt to access the promotional system.

As shown by operation 264, in some embodiments, the promotional system may provide to the consumer an option to log on, providing credentials such as a username and password, for example. The credentials may be considered explicit data. In scenarios in which the promotional system may access stored credentials in cache or cookies, for example, the system may recognize the consumer as already being logged on, and may not provide the option to log on. Additionally or alternatively, the option to log on may be provided for a consumer to log on at any point during the process illustrated in FIG. 2C.

Continuing to operation 268, in instances in which the consumer is logged on, the promotional system may access profile information that may be stored locally to memory of the consumer device or remotely to memory of the promotional system (such as a promotional database). Profile information may comprise any consumer provided demographic information, preferences, location information, and/or any other information gathered and stored by promotional system and associated with a consumer. Said differently, the profile information may comprise explicit data and implicit data.

Further, at operation 276, the promotional system may access consumer transaction history that may be stored in memory and/or a promotional database and may comprise data relating to past purchases placed by the consumer including providers for which the consumer purchased promotions. The data may comprise indications of specific promotion types or channels from which the consumer often makes purchases or any other information relating to prior purchases made by the consumer, and may therefore be considered implicit data.

Continuing to operation 280, the promotional system may include means for accessing stored cookies (e.g., web browser created text files) on a consumer device. Any such cookies may be associated with the promotional system, third party system, or any other system capable of storing cookies on a consumer device. The cookies may comprise information relating to consumer trends or interests that may allow the promotional system to identify a home channel page to present to a consumer in order to target the consumer with a particular promotion type or channel of impressions. In some embodiments, the promotional system may utilize browsing history to track which third party websites consumers have recently visited and/or which goods or services consumers may be purchasing.

Additionally or alternatively, the promotional system may detect a current location of consumer device, as shown in operation 284. This detection may be particularly advantageous, for example, when a consumer is not logged onto the promotional system, has not provided a home location, and/or a detected real time location conflicts with a known home location of a consumer. The promotional system may detect a real time location of consumer device by any number of methods, such as those described with respect to operation 1212.

At operation 288, the promotional system may analyze, and/or assign a weight to any or all explicit and/or implicit data accessed in regard to operations 272-284 described above and/or any other information made accessible to the promotional system. As such, the promotional system may produce analytics data to aid in selecting promotions, promotion types, and/or channels that a consumer may be likely interested in. Greater weights may be applied to information more impactful in marketing appropriate promotions, while lower weights may be applied to information having less of an impact. In some embodiments, a set of ranked rules such as those described with respect to operation 220 may be considered in the weighting of the explicit and/or implicit data. In some embodiments, the rules may override or outweigh other factors in ranking and/or home channel page identification algorithms.

At operation 292, the promotional system may identify a home channel page to default a consumer to, based on the outcome of the analysis and weighting of information as described with respect to operation 288, and described in further detail with respect to operation 220. At operation 296, the promotional system may present a consumer with the identified home channel page, as described with respect to operation 228. As such, the promotional system may return, to a consumer device, a response, such as an HTTP response, indicative of content and/or home channel page identifiers to display. The response transmitted from the promotional system to the consumer device may be generated based on any of the explicit and/or implicit parameters (and therefore, user input, and/or implicit data). In some embodiments, some of the operations of FIG. 2C may be bypassed, and the promotional system may retrieve from memory, or cookies stored on the consumer device, for example, an indication of which home channel page to display to a consumer.

Figure 3B:
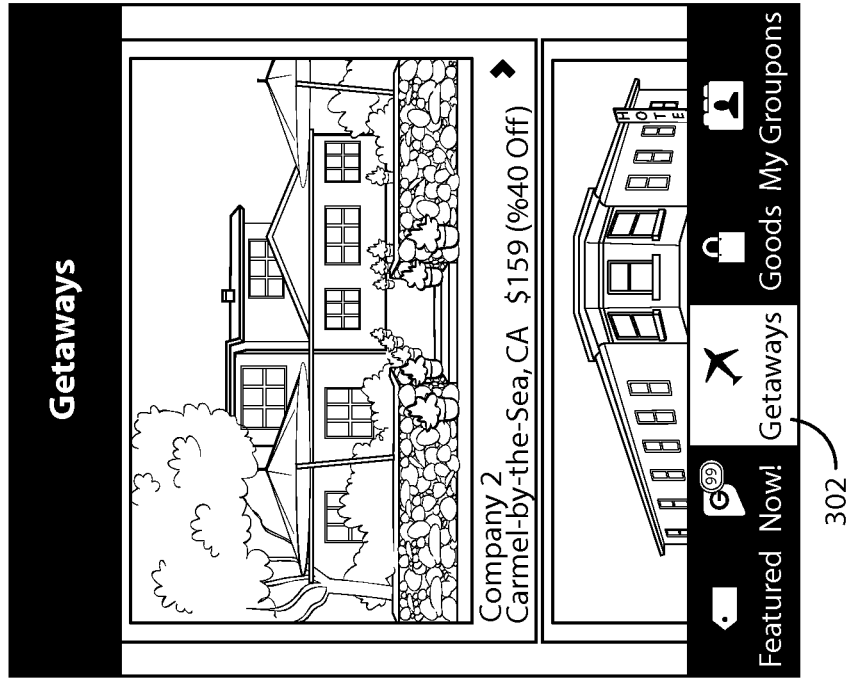
Figure 3A:
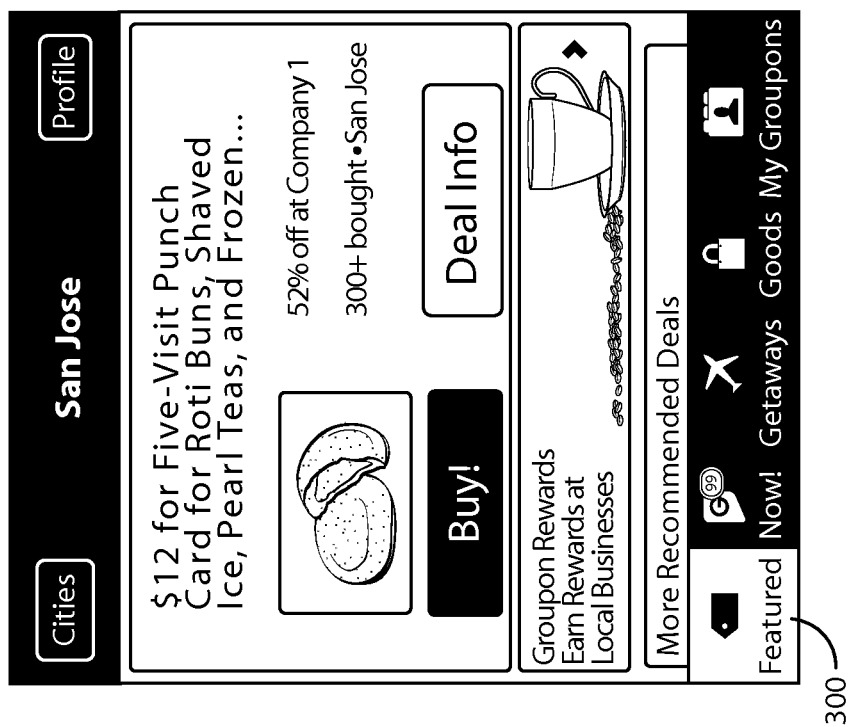

FIGS. 3A-3K (FIG. 3I intentionally omitted) show example home channel pages that may be presented by one or more display screens of a consumer device in accordance with some embodiments discussed herein. The displays of FIGS. 3A-3K (FIG. 3I intentionally omitted) may be presented to a consumer by a consumer device and can aid a user in viewing, searching, browsing for a promotion, and/or purchasing a promotion. FIG. 3A illustrates a display on which a home channel page has been presented. The depicted home channel page is a "featured" channel page, as shown by indicator 300, which includes various provider sponsored and/or user-recommended promotions. In one embodiment, the featured channel page may be identified as the home channel page for a given consumer based on explicit and/or implicit data that is analyzed and weighted by the promotional system.

In still other embodiments, the content of the depicted featured channel page may be configured based on explicit and/or implicit data associated with the consumer. For example, in the depicted embodiment, based on implicit real time location data, the promotional system may identify and present to a consumer the depicted home channel page, which is the featured channel page for the city of San Jose, Calif. If the consumer traveled, for example to the city of Palo Alto, Calif., the promotional system may identify and present to a consumer a home channel page that is the featured channel page for Palo Alto.

FIG. 3B illustrates a display on which a home channel page has been presented. The depicted home channel page is a "getaways" channel page, as shown by indicator 302. A consumer's home channel page may be defaulted to the "getaways" channel page if they have indicated in a user profile (explicit data), or by past purchase history (implicit data), for example, that they have an interest in traveling.

Figure 3D:
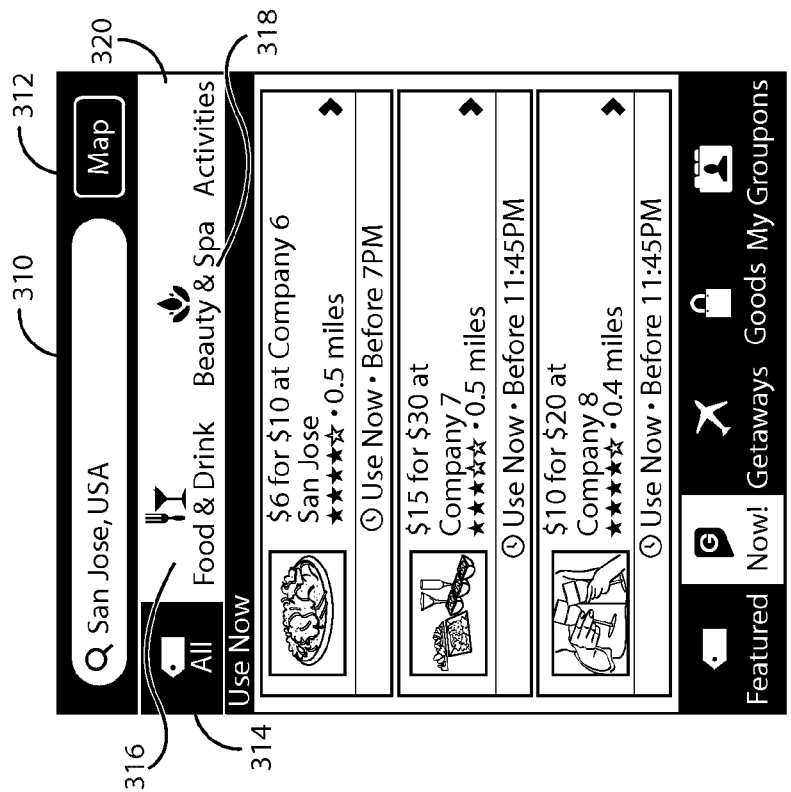
Figure 3C:
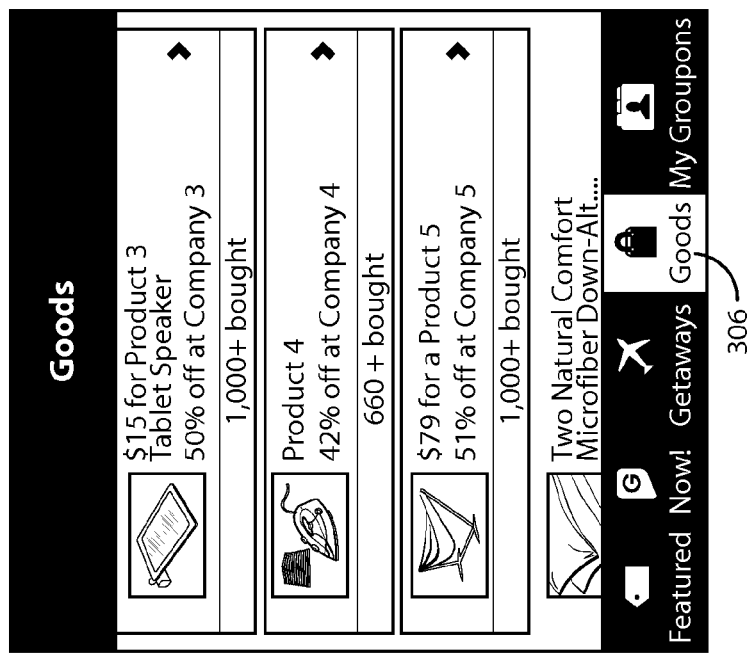

FIG. 3C illustrates a display which is defaulted to a "goods" channel page, as shown by indicator 306. The Goods channel page may be an appropriate home channel page for consumers who have purchased a significant amount of goods in the past (implicit data) or who are otherwise targeted for marketing products to. In one embodiment, based on a consumer's website browsing habits and mobile device purchase history (e.g., implicit and explicit data), the promotional system may identify and present to a consumer a home channel page that is the Goods channel customized to emphasize promotions for mobile devices.

FIG. 3D illustrates an example home channel page that is further configurable using a search field 310. In the depicted embodiment, the example home channel page is a "now" channel page having a search field 310 that allows a consumer to manually enter a location (explicit data). Upon entering a location into the search field 310 (i.e., San Jose), a user may be presented with promotions that are offered for a limited time (e.g., within the next few hours) by providers in San Jose. In another embodiment, in lieu of using the search field 310, a consumer may select a desired location using map indicator 312, for which a resulting display is shown in FIG. 3H and described below. Selection of filter 314 causes the promotional system to display all promotions for the entered location, while selection of filter 316 causes only restaurant or other food and drink promotions to be displayed. Selection of filters 318 and 320 cause beauty or spa related promotions, and activity promotions to be displayed, respectively.

Figure 3E:

FIG. 3E illustrates another example display of a home channel page. The Featured channel, as introduced above and as shown by indicator 330, may be identified as a home channel page in an instance where one or more featured providers match providers listed among a consumer's purchase history (e.g., implicit data).

Figure 3F:
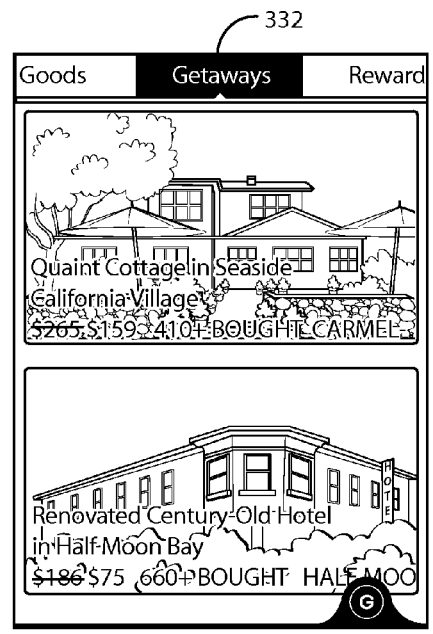

FIG. 3F illustrates another example display of a home channel page. The Getaways channel, as introduced above and as shown by indicator 332, may be identified as a home channel page in an instance where one or more featured getaways match previously visited locations of the consumer or prior travel reservations listed among a consumer's purchase history (e.g., implicit data).

Figure 3G:
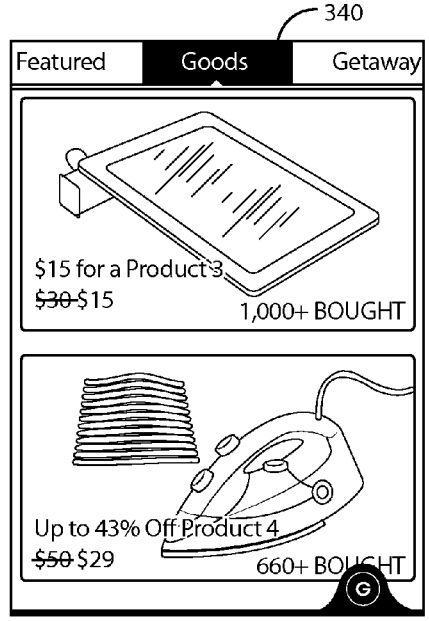
Figure 3H:
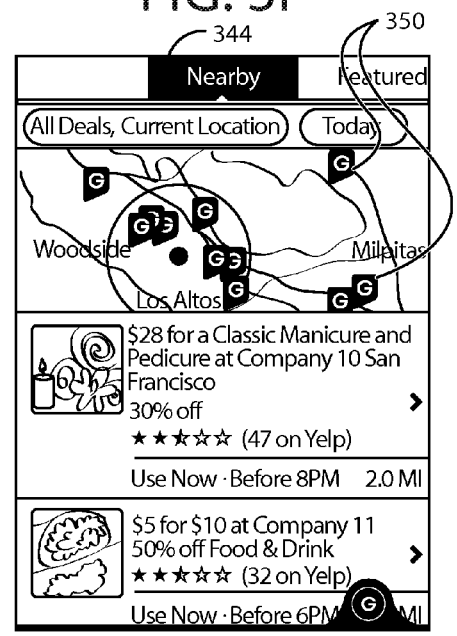

FIG. 3G illustrates another example display of a home channel page. The Goods channel, as introduced above and as shown by indicator 340, may be identified as a home channel page in an instance where one or more featured goods (e.g., an audio speaker for a mobile device) match previously visited web advertisements or web searches (e.g., implicit data).

FIG. 3H illustrates another example display of a home channel page. In the depicted embodiment, the promotional system may identify the "nearby" channel page as a consumer's home channel page, as shown at indicator 344, based on the consumer's preference for purchasing promotions through the "nearby" channel page as demonstrated by the consumer's purchase history (e.g., implicit data). In the depicted embodiment, the home channel page is further configured to display map-based presentation of selectable promotions 350 for Palo Alto, Calif., based on a detected real time location (implicit data). In one embodiment, the promotional system may configure a home channel page to present a map-based presentation of impressions in addition to, or in lieu of, a list-based presentation of impressions based on explicit or implicit data that is suggestive of a consumer's preference.

Figure 3J:
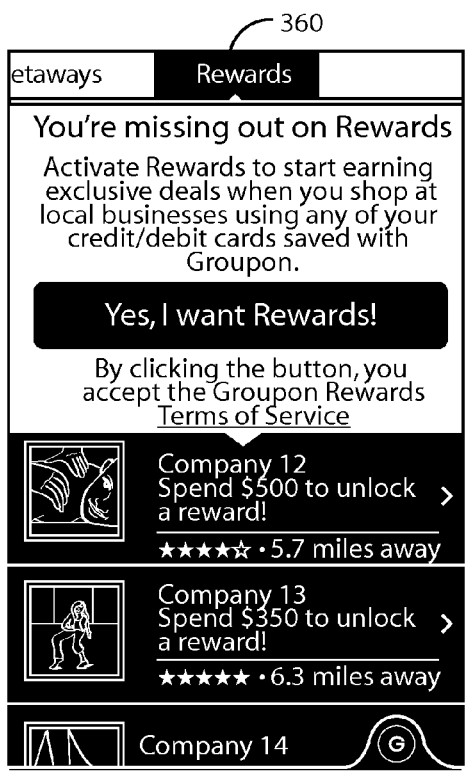

FIG. 3J illustrates yet another display of a home channel page. In the depicted embodiment, the promotional system may identify the "rewards" channel, shown by indicator 360, as a consumer's home channel page based on explicit or implicit data that suggests that the consumer has not yet enrolled in a rewards program.

Figure 3K:

FIG. 3K illustrates still another display of a home channel page. In the depicted embodiment, the content channel ranking module 170 identified the VIP (very important person) channel, shown by indicator 370, as a consumer's home channel based on explicit or implicit data that suggests that the consumer has, within a defined period of time, purchased a number of promotions beyond a threshold level or perhaps completed purchase transactions above a threshold amount.

The home channel pages illustrated in FIGS. 3A-3K (FIG. 3I intentionally omitted) are provided as examples and it will be appreciated that other home channel pages may be identified and provided to a consumer as a default home page. Other example home channel pages may include personal collections channels, best of channels, or recently viewed channels.

Figure 4:
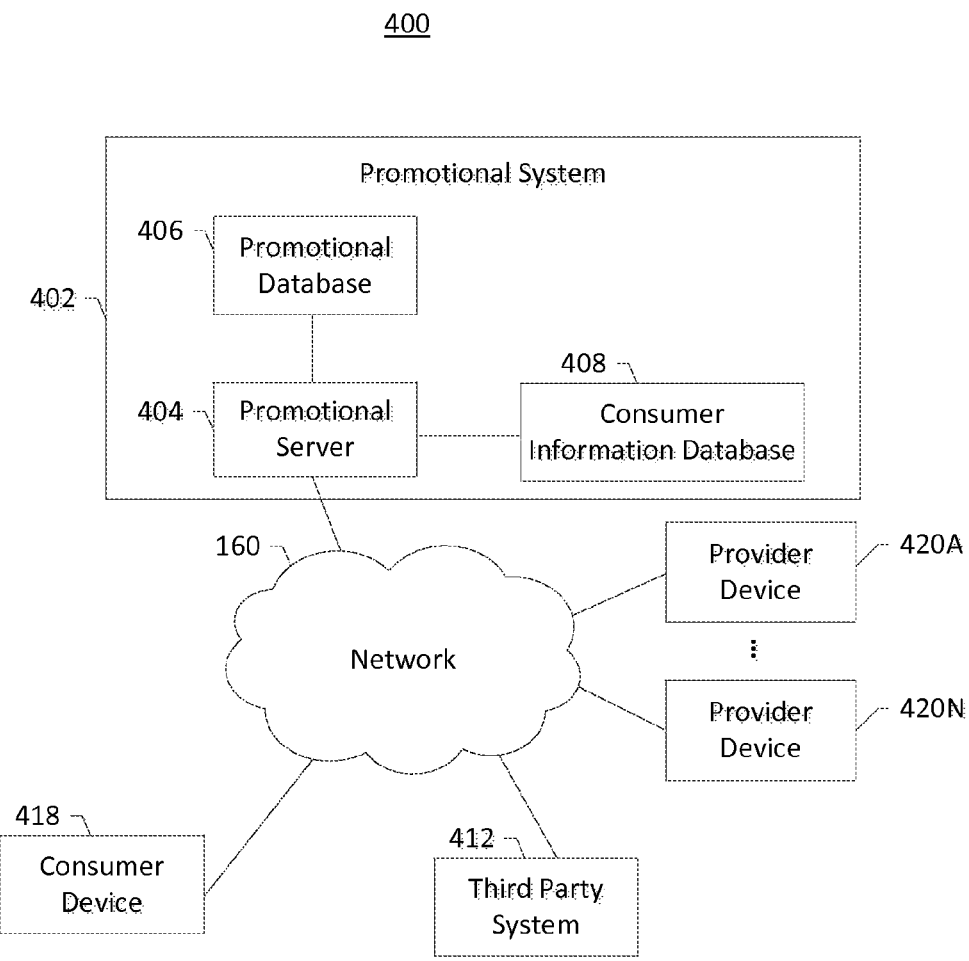
FIG. 4 shows an example system in accordance with some example embodiments discussed herein.

FIG. 4 shows system 400 including an example network architecture for a system, which may include one or more devices and sub-systems that are configured to implement some embodiments discussed herein. For example, system 400 may include promotional system 402, which can include, for example, promotional server 404, promotional database 406, and consumer information database 408, among other things (not shown). Promotional server 404, may be considered an implementation of content server 156 and can be any suitable network server and/or other type of processing device. Promotional database 406 may be considered an implementation of content database 154 can be any suitable network database configured to store provider and promotion data, transaction data, and/or redemption data, such as that discussed herein. Consumer information database 408 may be considered an implementation of user information database 158 and can be any suitable network database configured to store consumer data, profile data, and/or the like. In some embodiments, the consumer information database 408 may be implemented on the same device as the promotional database 406. In this regard, promotional system 402 may include, for example, at least one backend data server, network database, cloud computing device, among other things.

Promotional system 402 may be coupled to one or more provider devices 420A-420N via network 160. Network 160 (as described above with respect to FIG. 1C) may be used to transmit implicit and/or explicit data from various devices to the promotional system 402. Requests and responses to and from the promotional system 402 may also be transmitted over network 160 in order to facilitate the identification of home channel pages, and other features of the promotional system described here in.

Provider devices 420A-420N may each be implemented as a personal computer and/or other networked device, such as a cellular phone, tablet computer, mobile device, etc., that may be used to access promotional system 402 in order to offer promotions for sale, for example. The depiction of "N" provider devices is merely for illustration purposes.

Promotional system 402 may be configured to communicate with one or more consumer devices 418 via network 160. Consumer devices 418, may be considered implementations of user device 162 may each be implemented as a personal computer and/or other networked device, such as a cellular phone, tablet computer, mobile device, etc., that may be used for accessing promotional system 402 in order to view impressions and/or purchase promotions. The consumer device 418 may additionally or alternatively be used to provide explicit and/or implicit data to the promotional system 402.

System 400 may also include at least one third party system 412, such as a credit card payment processing system and/or social networking site, among other things. The third party system 412 may provide implicit data to the promotional system 402, such as consumer purchase trends, preferences, and/or other implicit data as described herein.

Figure 5:
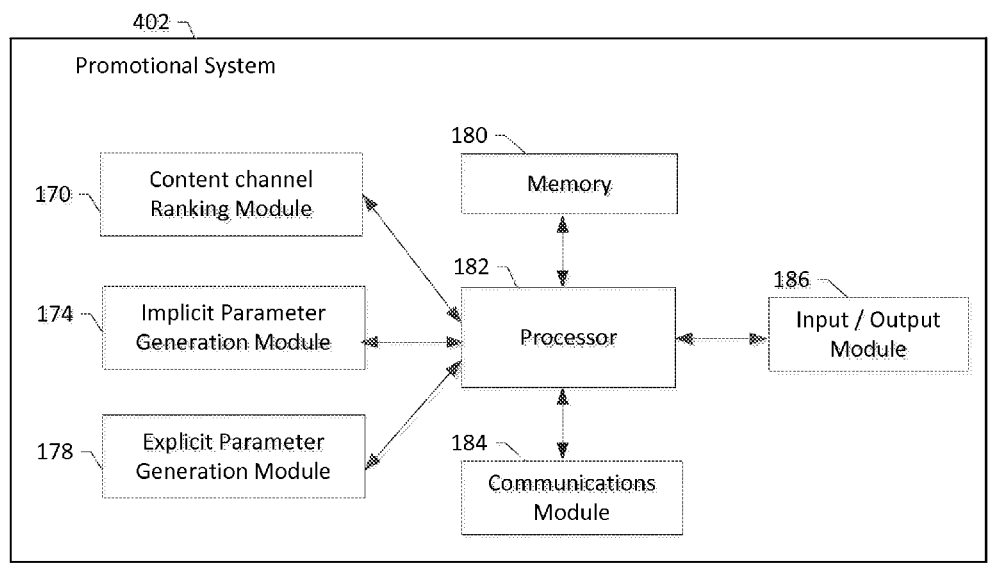
FIG. 5 shows a schematic block diagram of circuitry that can be included in a computing device, such as a promotional system, in accordance with some example embodiments discussed herein.

FIG. 5 is a schematic block diagram of promotional system 402. It will be appreciated that the promotional system 402 is provided as an example embodiment, and may be considered an implementation of a host system 152. As illustrated in FIG. 5, in accordance with some example embodiments, promotional system 402 may include various means, such as one or more processors 182, memories 180, communications modules 184, and/or input/output modules 186. In some embodiments, a content channel ranking module 170 may be included. In this regard, promotional system 402 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 180) that is executable by a suitably configured processing device (e.g., processor 182), or some combination thereof. The promotional system 402 may be configured to perform one or more operations described herein, such as those discussed in connection with FIGS. 2A, 2B, and 2C.

Figure 6:
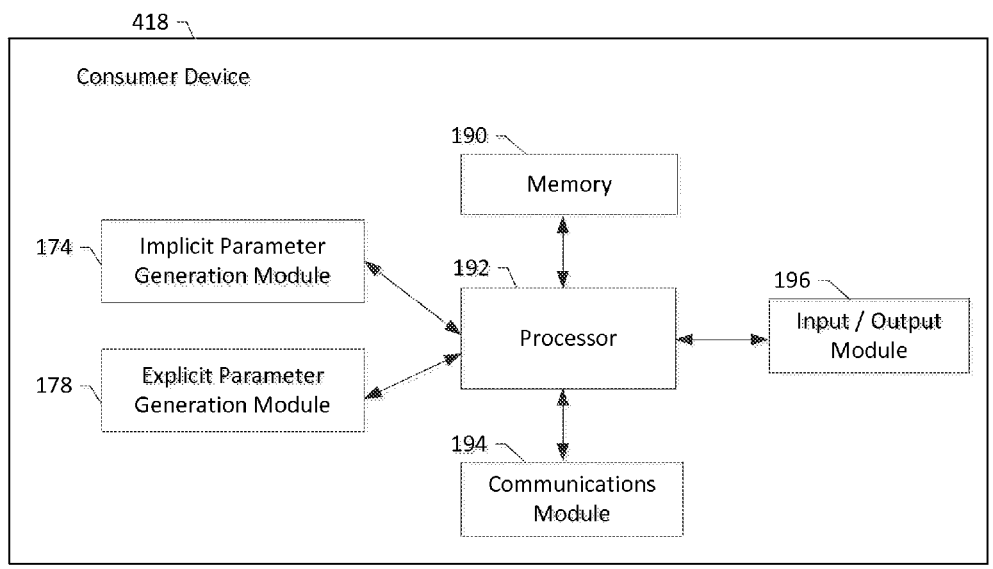
FIG. 6 shows a schematic block diagram of circuitry that can be included in a computing device, such as a consumer device, in accordance with some example embodiments discussed herein.

FIG. 6 is a schematic block diagram of circuitry that can be included in a computing device, such as a consumer device, in accordance with some example embodiments discussed herein. In some example embodiments, the implicit parameter generation module 174 and/or explicit parameter generation module 514 may be implemented on the consumer device 418. As described above, the consumer device 418 may include means, such as an input/output module 196, or a user interface, for receiving user input. The implicit parameter generation module 174 and/or explicit parameter generation module 514 may be utilized by the consumer device to generate parameters that may be transmitted, such as by communications module 194, over a network to a promotional system, such as promotional system 402. In some embodiments, the generation of explicit and/or implicit parameters may be controlled partially, or completely, by a processor 192, of the consumer device 418. The consumer device 418 may access data from local memory, such as memory 190, to generate the explicit and/or implicit parameters, and transmit data to the promotional system 402. In response, the consumer device 418 may receive the channel page indication, and display a channel page with the input/output module 196, as described above. It will be appreciated that FIG. 6 is an example configuration of a consumer device, according to an example embodiment, and that numerous other configurations of a consumer device may be implemented. Additionally, some or all of the components described with respect to the consumer device 418 in FIG. 6 may be implemented on the promotional system, such as the promotional system 402 of FIG. 5.

While the host system and promotional system embodiments are provided as example embodiments, it will be appreciated that many other embodiments indeed exist. Additionally, any of the components and/or operations of a promotional system may be implemented on a host system, and/or any of the components and/or operations of a host system may be implemented on a promotional system.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

These computer program instructions may also be stored in a computer-readable storage medium (e.g., memory 180) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 182 and/or home page identification module 510 discussed above with reference to FIG. 5, to produce a machine, such that the computer program product includes the instructions which execute on the computer or other programmable data processing apparatus create a means for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A host system for identifying a home content channel page to be initially displayed based on explicit parameters and implicit parameters correlated to a unique user ID, the host system comprising at least one processor and at least one memory including computer program code, the at least one memory and the computer program code configured to, with the processor, cause the host system to at least:
   receive user input provided via a remote user device associated with the unique user ID;
   generate the explicit parameters based on the user input;
   receive implicit data associated with a user of the remote user device, wherein the implicit data is received from at least one of the remote user device, a remote third party system, or a prior purchase history associated with the unique user ID accessed on the host system;
   generate the implicit parameters based on the implicit data;
   store the explicit parameters and the implicit parameters on the at least one memory in association with the unique user ID;
   receive a host system request from the remote user device to access at least one of a website or mobile application of the host system;
   in response to receiving the host site request, identify the home content channel page of a plurality of content channel pages hosted by the host system by adding weighted parameters to at least two of the explicit parameters and implicit parameters, and ranking the plurality of content channels based on the weighted explicit parameters and the implicit parameters;
   select one of the plurality of content channel pages for suppression based on the ranking; and
   transmit an indication of the home content channel page to the remote user device that is configured to cause a user interface of the remote user device to render the home content channel page at website or mobile application access.

2. The host system according to claim 1, wherein the host system is further configured to:
   identify at least one promotion based on the home content channel page and at least one of the explicit parameters or implicit parameters.

3. The host system according to claim 1, wherein the host system is further configured to:
   access the explicit parameters from a user information database.

4. The host system according to claim 1, wherein the explicit parameters comprise at least a detected location of the remote user device.

5. A computer program product for identifying a home content channel page to be initially displayed based on explicit parameters and implicit parameters correlated to a unique user ID, the computer program product comprising at least one non-transitory computer-readable storage medium having computer-executable program code instructions stored therein, the computer-executable program code instructions comprising program code instructions to:
   receive user input provided via a remote user device associated with the unique user ID;
   generate the explicit parameters based on the user input;
   receive implicit data associated with a user of the remote user device, wherein the implicit data is received from at least one of the remote user device, a remote third party system, or a prior purchase history associated with the unique user ID accessed on a host system;

generate the implicit parameters based on the implicit data;

store the explicit parameters and the implicit parameters on the at least one non-transitory computer-readable storage medium in association with the unique user ID;

receive a host system request from the remote user device to access at least one of a website or mobile application of the host system;

in response to receiving the host site request, identify the home content channel page of a plurality of content channel pages hosted by the host system by adding weighted parameters to at least two of the explicit parameters and implicit parameters, and ranking the plurality of content channels based on the weighted explicit parameters and the implicit parameters;

select one of the plurality of content channel pages for suppression based on the ranking; and transmit an indication of the home content channel page to the remote user device that is configured to cause a user interface of the remote user device to render the home content channel page at website or mobile application access.

6. The host system according to claim 5, wherein the host system is further configured to:

identify at least one promotion based on the home content channel page and at least one of the explicit parameters or implicit parameters.

7. The host system according to claim 5, wherein the host system is further configured to:

access the explicit parameters from a user information database.

8. The host system according to claim 5, wherein the explicit parameters comprise at least a detected location of the remote user device.

9. The computer program product of claim 5, wherein at least one other content channel page of the plurality of content channel pages hosted by the host system is accessible via the application while the rendered home content channel page is displayed.

10. An integrated system for identifying a home content channel page to be initially displayed based on explicit parameters and implicit parameters correlated to a unique user ID, the integrated system comprising:

(a) a device configured to:
receive user input associated with the unique user ID;
transmit a host system request to access at least one of a website or mobile application of the host system, the host system request including the user input;

receive a home content channel page indication from the host system in response to the host system request, wherein the home content channel page indication identifies a home content channel page of a plurality of content channel pages hosted by the host system; and in response to receiving the home content channel page indication from the host system, render, via a user interface of the device, the home content channel page at website or mobile application access, based on the content channel page indication, wherein at least one other content channel page of the plurality of content channel pages hosted by the host system is accessible via the user interface;

and (b) the host system configured to receive the host system request and the user input from the device, and in response to receiving the host system request perform the following:

generate the explicit parameters based on the user input;

receive implicit data associated with a user of the user device, wherein the implicit data is received from at least one of the user device, a remote third party system, or a prior purchase history associated with the unique user ID accessed on the host system;

generate the implicit parameters based on the implicit data;

identify the home content channel page of the plurality of content channel pages hosted by the host system by adding weighted parameters to at least two of the explicit parameters and implicit parameters, and ranking the plurality of content channels based on the weighted explicit parameters and the implicit parameters;

select one of the plurality of content channel pages for suppression based on the ranking; and transmit to the user device the home content channel page indication.

11. The integrated system according to claim 10, wherein the host system is further configured to:

identify at least one promotion based on the home content channel page and at least one of the explicit parameters or implicit parameters.

* * * * *